March 17, 1953 E. E. PRATHER 2,631,702
TRANSMISSION OPERATING MECHANISM
Filed April 22, 1950 7 Sheets-Sheet 3
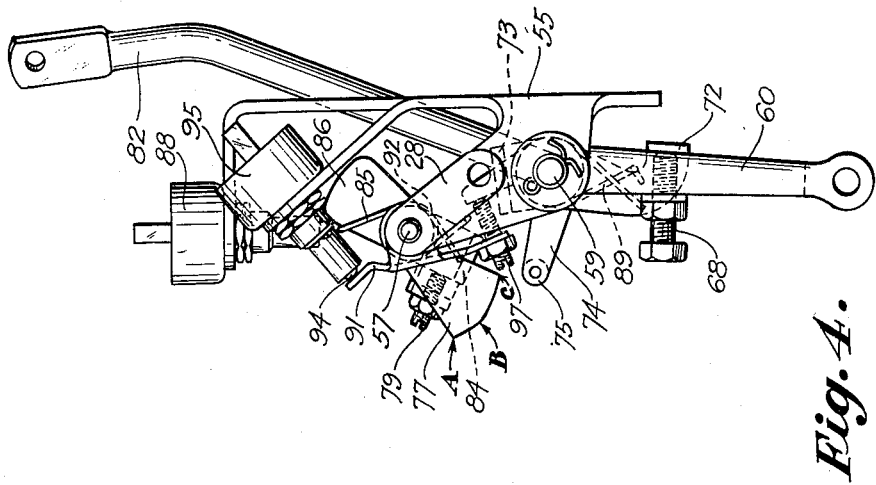
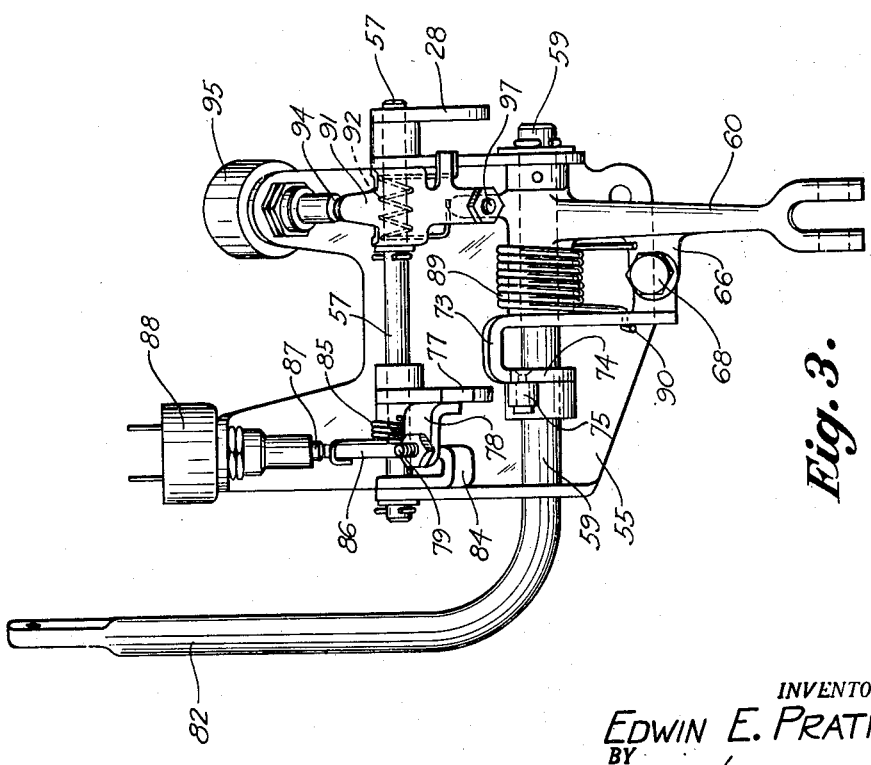
INVENTOR.
Edwin E. Prather
BY
H.O. Clayton
ATTORNEY

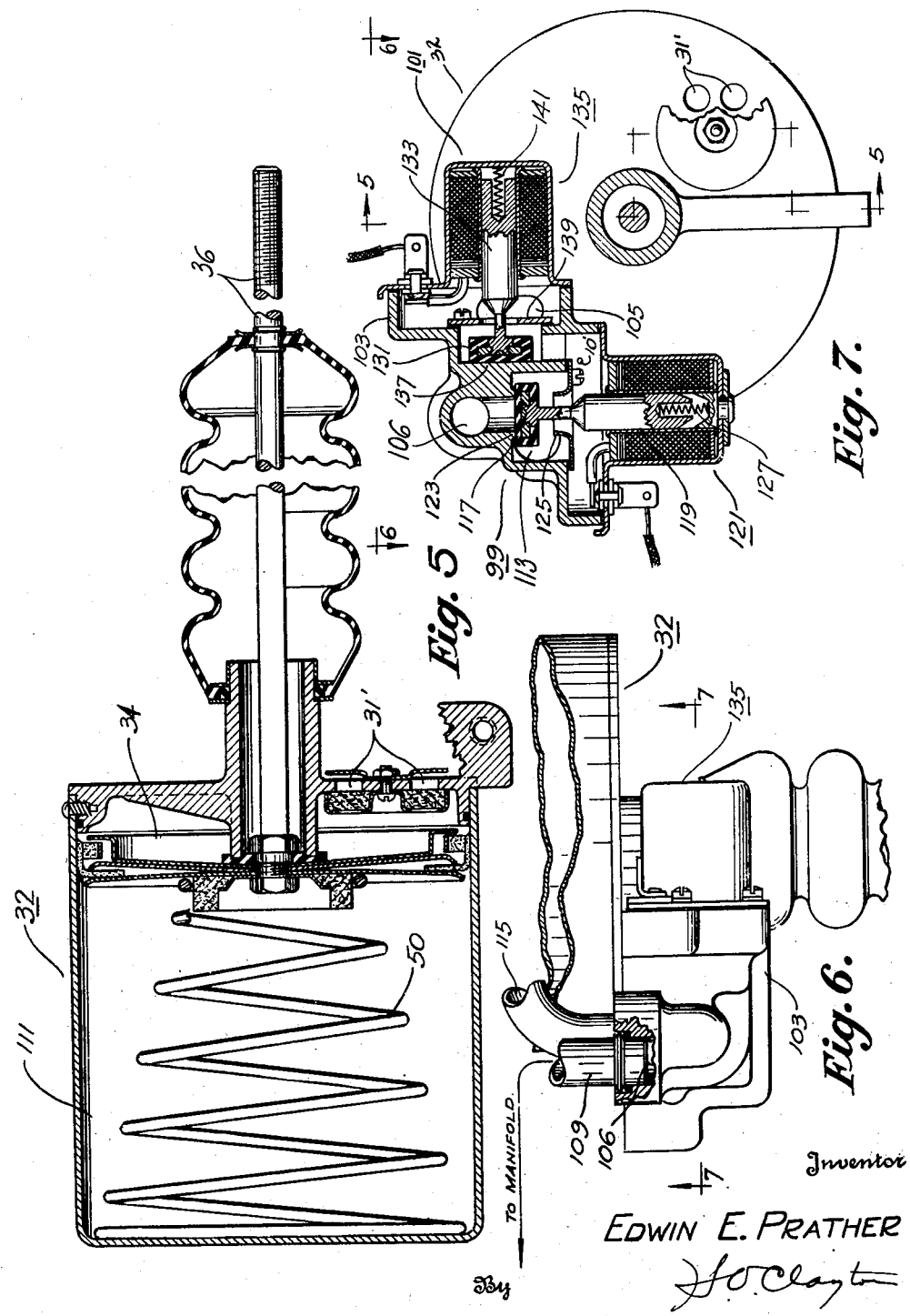

March 17, 1953  E. E. PRATHER  2,631,702
TRANSMISSION OPERATING MECHANISM
Filed April 22, 1950  7 Sheets-Sheet 5

Inventor
EDWIN E. PRATHER
By H. O. Clayton
Attorney

March 17, 1953 E. E. PRATHER 2,631,702
TRANSMISSION OPERATING MECHANISM
Filed April 22, 1950 7 Sheets-Sheet 6

INVENTOR.
EDWIN E. PRATHER
BY J. O. Clayton
ATTORNEY

Inventor
EDWIN E. PRATHER
By H. O. Clayton
Attorney

Patented Mar. 17, 1953

2,631,702

UNITED STATES PATENT OFFICE 2,631,702

TRANSMISSION OPERATING MECHANISM

Edwin E. Prather, South Bend, Ind., assignor to Bendix Aviation Corporation, South Bend, Ind., a corporation of Delaware Application April 22, 1950, Serial No. 157,567

8 Claims. (Cl. 192—.073)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission, facilitated by an operation of the throttle and friction clutch, being effected by power means if the driver elects this operation of the mechanism.

A further object of my invention is to provide, in an automotive vehicle including a power plant comprising a fluid coupling, an accelerator, a friction clutch, an engine controlling throttle, a three speeds forward and reverse transmission, and a gear shift lever, means for operating and for facilitating the operation of said transmission, said means including power means, comprising a single acting motor, which is automatically operable, when the clutch pedal is in its clutch engaged position and the accelerator is released, to establish the transmission either in its second gear setting or its high gear setting depending upon the speed of the vehicle, the friction clutch and the throttle preferably being operated by said motor to facilitate this operation of the transmission, said means further including manually operated means for effecting, at any time, any one of the gear settings of the transmission.

A further object of my invention is to provide, in the power plant of an automotive vehicle, a manually and power operated mechanism for operating a three speeds forward and reverse transmission and a friction clutch, said mechanism being capable of a manual operation to operate the transmission and also capable, when the accelerator and clutch pedal are released, of effecting a power operation of the transmission to alternately effect the second and high gear settings thereof, the friction clutch being disengaged to facilitate each of said operations and automatically re-engaged after each operation is completed; and another object of my invention is to include, in such a mechanism, means for insuring a completion of the operation of the clutch and transmission once initiated and for insuring, by a recycle operation of the mechanism, the operation of the mechanism called for by a governor operated relay said relay constituting one of the principal controls of the mechanism.

Yet another object of my invention is to supplement the abovementioned mechanism by combining therewith means operative in accordance with the manifold vacuum of the engine of the vehicle for automatically effecting a high gear operation of the transmission said operation being effected despite a depression of the accelerator at the time, the throttle valve of the carburetor of the engine being automatically closed as this operation is being effected.

A further object of the invention is to provide a change speed transmission mechanism for an automotive vehicle said mechanism including a torque and speed responsive three speeds forward and reverse transmission in combination with a Keller-pawl type of overdrive mechanism said mechanism being automatically operated, to effect its overdrive setting, immediately after the aforementioned transmission is established in its high gear setting the throttle of the vehicle being at the time closed to reverse the engine torque to make this operation possible. The Keller-pawl type of overdrive is disclosed in U. S. Patent No. 2,225,174, dated December 17, 1940.

Yet another object of my invention is to provide, in the power plant of an automotive vehicle including a change speed transmission and a clutch pedal, a mechanism for automatically effecting a power operation of the transmission when the clutch pedal is in its released position the clutch and throttle of the power plant being operated to facilitate the operation of the transmission; and a furher object of my invention is to so construct said mechanism as to make possible a manual operation of the transmission at the will of the driver the power means being temporarily disabled to effect this operation.

An important object of my invention is to provide, in an automotive vehicle including a three speeds forward and reverse transmission and a Keller-pawl type of overdrive mechanism, transmission operating means including means for effecting an upshift operation of said mechanism to effect a shift from second gear direct to third gear direct, by virtue of either an operation of means including an accelerator operated switch and a governor operated switch or by virtue of an operation of means including an intake manifold vacuum operated switch and said governor operated switch; and a further object of my invention is to so construct said transmission operating means as to make possible a downshift operation of said mechanism, to effect a shift from third gear overdrive to second gear direct, by an operation of means including the aforementioned accelerator operated switch and the aforementioned governor operated switch; and another object of my invention is to so construct said transmission operating means as to effect, by an operation of the accelerator operated switch, a kickdown operation of the mechanism from third gear overdrive to third gear direct.

A further object of the invention is to provide a change speed transmission mechanism adapted for use in an automotive vehicle said mechanism including the combination of a three speeds forward and reverse transmission unit and a Keller-pawl overdrive unit, together with means for so operating this transmission mechanism as to successively effect a shift from second gear direct to third gear direct and then to third gear overdrive, these operations being followed, with a kickdown operation of the mechanism, by a shift from third gear overdrive to third gear direct said operation being followed by an operation to second gear direct; and a further object of the invention is to so construct said mechanism as to make possible a shift of the transmission mechanism from third gear overdrive directly to second gear direct.

The above and other objects and features of the invention will appear more fully hereinafter from a consideration of the following description taken in connection with the accompanying drawings wherein certain embodiments of the invention are illustrated by way of example.

Figure 3 is a front view disclosing details of a part of the motor operated controls and also disclosing the accelerator operated switch of my invention;

Figure 4 is a side view of the mechanism disclosed in Figure 3;

Figure 5 is a sectional view, taken on the line 5—5 of Figure 7, disclosing details of the pressure differential operated motor of my invention;

Figure 6 is a view, partly in section and taken on the line 6—6 of Figure 7, disclosing details of the air transmitting ducts constituting part of the motor unit disclosed in Figures 5 and 7;

Figure 7 is a view, largely in section, and taken on the line 7—7 of Figure 6, disclosing details of the solenoid operated valves for controlling the operation of the motor unit in Figure 5;

Figure 1:
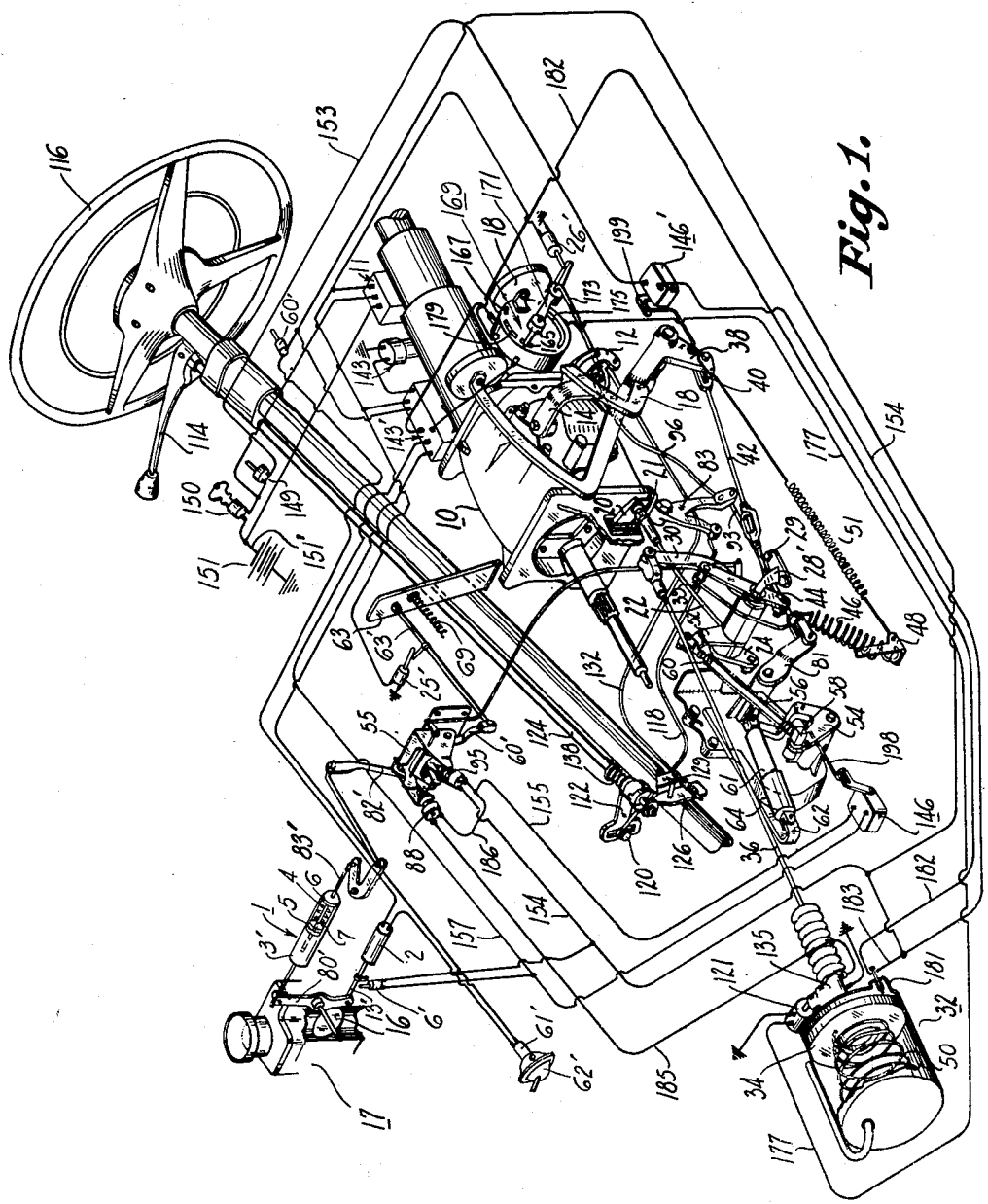
Figure 1 is a diagrammatic view of my invention disclosing the principal features thereof.

Referring now to Figure 1 disclosing a preferred embodiment of my invention, a three speeds forward and reverse transmission 10 of any well known type is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated. The transmission 10 is preferably combined with a Keller-pawl type of overdrive mechanism diagrammatically disclosed in Figure 1 and indicated by the reference numeral 11; and these two transmission mechanisms together constitute the change gear transmission mechanism controlled by the hereinafter described transmission operating mechanism constituting the essence of my invention. This well known Keller-pawl overdrive mechanism, no claim to which is made per se, includes a grounded overdrive operated solenoid 20' electrically connected in series with a grounded battery 151 and a normally open switch 21' of an overdrive relay 23'. As disclosed in Figure 2 the coil 24' of the relay 23' is wired in series with the battery 151 and a grounded accelerator operated kick-down switch 25' which is closed just as the accelerator is depressed to wide open throttle position. The relay 23' is also controlled by a grounded rail operated switch 26' which is normally closed but which is opened as the high gear operation of the three speeds forward and reverse transmission 10 is being completed.

Describing the operation of the Keller-pawl overdrive mechanism the solenoid 20' serves when energized to operate a pawl, not shown, to effect the kickdown setting of the mechanism; when the solenoid 20' is de-energized the pawl is operated to effect the overdrive setting of the mechanism. It is necessary that there be a torque reversal to facilitate the kickdown of the mechanism, accordingly to this end there is provided means for temporarily disabling the ignition system of the vehicle; and this operation of course temporarily renders the engine inoperative as a driving means with a resultant reversal of the torque. With the mechanism disclosed in the drawing the ignition coil 27' of the ignition system of the vehicle is momentarily grounded when the kickdown operation of the mechanism is being effected this operation being accomplished by means including a grounded switch 29' which is electrically connected to said coil. The switch 29' is actuated by the solenoid 20' said switch being closed for a limited time when said solenoid is energized. As to this limited time the switch is made until the pawl is disengaged whereupon the switch is broken to restore the operation of the ignition switch and the ignition system of the engine. The pawl of the overdrive mechanism is moved to its engaged position to effect the overdrive, that is, upshift operation of the mechanism and is moved to its disengaged position to effect the downshift setting of the mechanism.

My invention in a measure has to do with the manually and power operated means for actuating the aforementioned transmission operating cranks 12 and 14, for operating the engine throttle 16 of the carburetor 17, and for operating a conventional friction clutch, not shown, said clutch preferably including the usual driving and driven plates forced into engagement by clutch springs. The aforementioned transmission and the clutch as well as the hereinafter referred to fluid coupling are of conventional design; accordingly, no claim is made thereto and the same are not disclosed in the drawings. The mechanism of my invention also preferably includes, in the power plant of the vehicle, a fluid coupling such for example as that which is incorporated in several 1946 passenger vehicles and said coupling preferably includes an impeller and a vaned rotor the latter serving to drive the aforementioned driving plate of the clutch.

The friction clutch, not shown, is operably connected to the clutch pedal 18 of the car by means including a crank 20 and a rod 22 pivotally connected to one end of the crank 20 at 21 and pivotally connected at its other end to a crank 24. As disclosed in Figure 14 the crank 24 is fixedly secured to one end of a cylindrically shaped shaft 26; and a cylindrically shaped shaft 27 is sleeved over the shaft 26. The latter shaft is rotatably mounted on a spindle 31 extending from the end of a support 28' which is fixedly secured in place by bolts 29. A crank 30 is fixedly connected at its lower end to one end of the shaft 27 and is pivotally connected at its upper end at 37 to one end of a rod 36; and the latter rod is connected at one of its ends to a piston 34 of a pressure differential operated motor 32.

Completing the description of the connection between the clutch pedal 18 and the clutch, a lower arm 38 of said pedal is connected, by a lost motion connection 40, to a rod 42; and the latter rod is fixedly connected to the lower arm of a two-armed crank 44 which is fixedly connected to the shaft 26. To a pin 39 extending laterally from the upper end of the crank 44 there is connected one end of an over-center spring 46 the lower end of which is connected to a bracket 48; and a clutch pedal return spring 51 is connected at one end to the bracket 48 and at its other end to the lower end of the arm 38 of the clutch pedal.

There is thus provided manually and power operated means for operating the clutch, the clutch pedal 18, by virtue of the operation of the lost motion connection 40, remaining stationary when the motor 32 is energized to disengage the clutch and the motor piston 34 remaining stationary when the clutch is disengaged by a manual operation of the clutch pedal. The latter operation is effected by virtue of the lost motion connection between the pin 39 and the crank 30.

Figure 14:
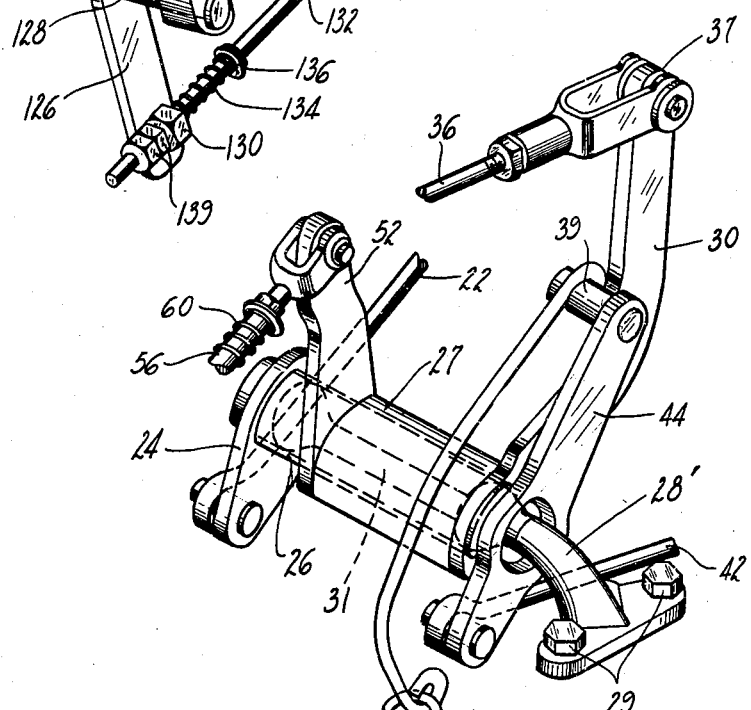
Figure 14 is a view disclosing details of a part of the linkage interconnecting the clutch pedal, the clutch, and the pressure differential motor.

Describing now the connection between the motor 32 and the transmission operated crank 14, as is described above, the piston operated rod 36 is connected to the crank 30; and the latter, when rotated, serves to rotate the shaft 27. A crank 52, Figure 14, is fixedly secured to the shaft 27 and said crank is yieldingly connected to one arm of a two-armed crank 54 by means including a two-diametered rod 56 pivotally connected at one of its ends by a yoke member to the upper end of the crank 52 and at its other end slidable through a trunnion block 58 pivotally mounted on the aforementioned arm of the crank 54; and a spring 60, sleeved over the rod 56 and positioned between the block 58 and the aforementioned yoke member, is compressed when the crank 52 is rotated counterclockwise, Figures 1 and 14, in the operation of the motor 32 in disengaging the clutch and operating the transmission. To the other arm of the two-armed crank 54 there is pivotally connected a dashpot 61 the stationary part of which is connected to the chassis of the vehicle by a bracket 62.

Figure 8:
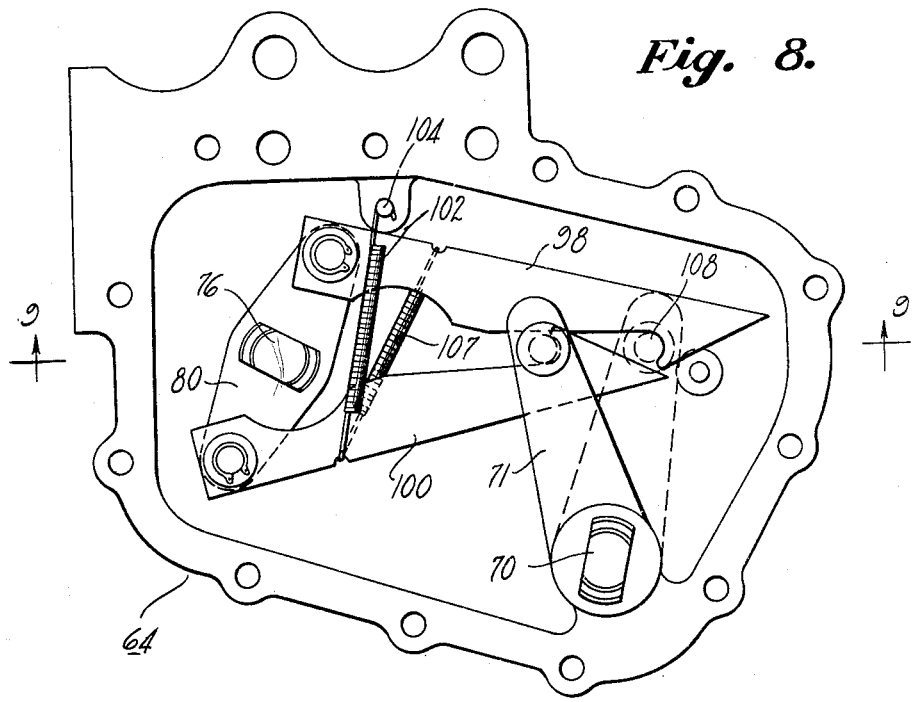
Figure 8 is a view disclosing details of the alternator mechanism of my invention.
Figure 9:
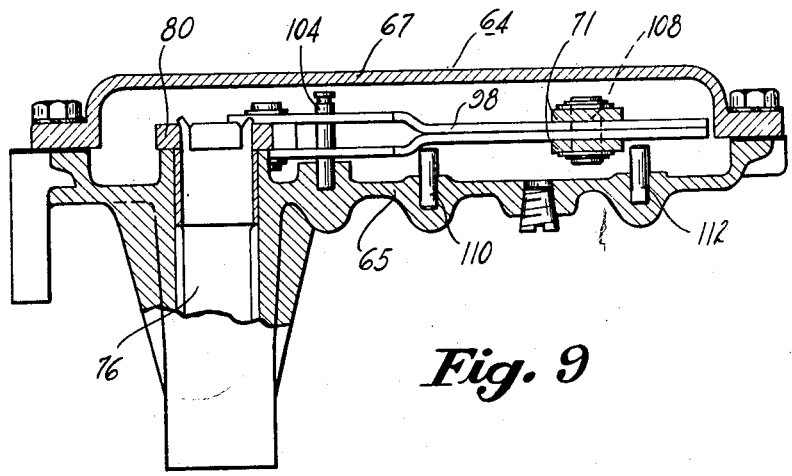
Figure 9 is a sectional view, taken on the line 9—9 of Figure 8, disclosing details of the alternator mechanism.

The two-armed crank 54 constitutes a part of an alternator 64, that is direction changing mechanism, said mechanism being disclosed in detail in Figures 8 and 9. The alternator mechanism includes casing parts 65 and 67 the latter being preferably fixedly secured to a part of the chassis of the car. The lever 54 is secured to a shaft 70, Figure 8, journalled in the casing part 65; and to the inner end of said shaft there is secured a two-part crank 71. The crank 71, together with the two-armed crank 54 constitutes an input lever member of the alternator mechanism. As disclosed in Figure 9, there is journalled in the casing part 65 a shaft 76 and to one end of said shaft within the alternator unit there is secured a two-armed crank 80. To the outer end of the shaft 76 there is secured a crank 81, Figure 1, said crank, together with the crank 80, constituting an output lever member of the alternator unit. The crank 81 is connected to the transmission operating crank 14 by means including a two-armed idler lever 83 mounted on the chassis. One arm of the idler lever 83 is pivotally connected to the lower end of the crank 81 by a rod 93, and said arm is connected to the crank 14 by a rod 96.

Completing the description of the alternator mechanism, to the upper arm of the two-armed crank 80 there is pivotally connected a two-part high gear leg member 98 having a claw-shaped outer end; and to the lower arm of the crank 80 there is pivotally connected a two-part second gear leg member 100 which is also shaped to provide a claw member at its outer end. A spring 102, secured at one of its ends to the leg 100 and at its other end to a pin 104, serves to bias said leg upwardly, Figure 8, to insure a completion of the power operated second gear setting of the transmission once initiated; and a spring 107, connected at its ends to the two legs 98 and 100, serves to bias said legs toward each other. A pin 108, interconnecting the upper ends of the two parts of the crank 71, is adapted to nest within one or the other of the recesses in the claw-shaped ends of the legs 98 and 100; accordingly, when the crank 71 is power operated in a clockwise direction, Figure 8, one or the other of the legs 98 and 100 is bodily moved to the right as a tension member to rotate the crank 14 to operate the transmission 10. As will be explained in greater detail hereinafter, when the motor 32 is de-energized a return spring 50 therein aided by the over-center spring 46 and the springs of the friction clutch, not shown, operates to move the alternator crank 72 counterclockwise, Figure 8, to the full line position disclosed in said figure; and in this position the alternator mechanism is prepared, that is, preselected, for a subsequent operation to actuate one or the other of the legs 98 and 100. Stops 110 and 112, Figure 9, mounted in the casing part 65, serve to limit the angular movement of the input crank 71.

There is thus provided, by the alternator 64, a mechanism for effecting a reciprocatory angular movement of the transmission operating crank 14 to alternately establish the transmission in its second and high gear settings this operation being effected by an operation of the motor 32. This alternator mechanism is not claimed in this application inasmuch as the same constitutes the invention of my application No. 755,299, filed June 18, 1947.

Describing now the manually operated means for operating the crank 14, a gearshift lever 114, mounted beneath the steering wheel 116 of the car, is operably connected to one of the arms of the idler lever 83 by means including a rod 118. One end of the rod 118 is adjustably connected, by means including a bolt 120, Figure 14, to a crank arm 122 fixedly secured to a shaft 124. As disclosed in Figure 14, a lever 126, pivotally mounted on a pin 128, is connected at its upper end to the lower end of the shaft 124; and said pin is preferably mounted in a bracket 129. A trunnion block 130, extending laterally from and fixedly secured to one of the arms of the lever 126, is provided with an opening to receive one end of a rod 132; and a spring 134, sleeved over the rod 132 and positioned between the block 130 and a flange 136 fixed to the rod 132, provides a yieldable connection between the lever 126 and the cross-shift operating crank 12 of the transmission mechanism. The gearshift lever 114 is so connected to the shaft 124 that angular movement of said lever in a plane perpendicular to the plane of the steering wheel serves to bodily move said shaft upwardly against the tension of a cross shift return spring 138; and angular movement of the shift lever in a plane parallel to the plane of the steering wheel serves to rotate the shaft 124 about its axis to effect an angular movement of the crank 122. The latter movement serves to move the rod 118 to establish the transmission in gear.

The upward, that is, cross-shift movement of the shaft 124 serves to rotate the lever 126 in a clockwise direction, Figure 14, and in this operation the trunnion block 130 abuts a nut 139 threadedly mounted on the end of the rod 132. The latter rod is thus moved to effect what is known as the cross-shift that is rail selecting operation of the transmission. Should the driver release the shift lever 114 after having completed this cross-shift operation then the spring 138, which is stronger than the spring 134, serves to return the lever 126 to its former position. In this operation the rod 132 remains in its cross-shift position and the spring 134 is compressed. The spring 138 is positioned between the hub of the crank 122 and a flange 140 the latter being fixedly secured to the steering column 142.

Figure 13:
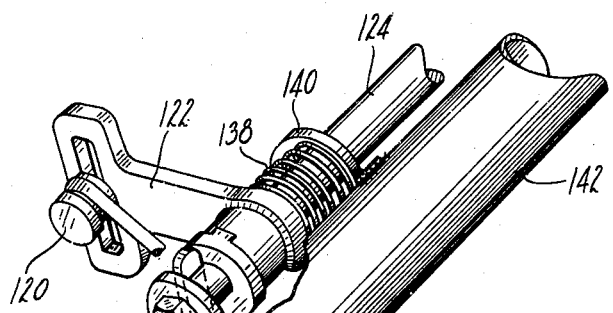
Figure 13 is a view disclosing details of the transmission operating force transmitting linkage located at the base of the steering column.

There is thus provided means for effecting a manual operation of the transmission; however it is to be noted that no claim is made to the force transmitting means disclosed in Figure 13 said means serving to interconnect the shift lever 114 with the transmission operating means 118 and 132. This particular mechanism is standard equipment of certain of the 1946 cars of the day.

Referring now to Figures 3 and 4 there are disclosed therein details of certain other controls of the mechanism disclosed in Figure 1. A support member 55 serves as a mounting for a shaft 57 and a shaft 59 said shafts being journalled in the sides of said support member. The shaft 59 is operably connected to the throttle valve 16 by cranks 80' and 82' and linkage including a link 83'. This connection also preferably includes electromagnetically operated throttle closing mechanism including a lost motion connection 1. This throttle closing mechanism includes a solenoid 2; and the armature, not shown, of this solenoid is connected to the lower arm of a crank 80' by a link 13'. For a purpose to be described hereinafter the link 13' serves to close a breaker switch 6' when the solenoid 2 is energized. The crank 80' is operatively connected to the link 83' by the lost motion connection 1 which includes a member 3' pivotally secured to one of its ends of said crank and bored to slidably receive one end of the rod 43'. A spring 4, sleeved over the rod 83' is interposed between a stop 5 secured to the rod 83', and a flange member 6 of a support member 7, extending from the member 3. There thus is provided power operated means for maintaining the throttle 16 closed despite a depression of the accelerator; and the operation of this mechanism and its cooperation with the other elements of the invention will be described in greater detail hereinafter. A two-armed crank 60', rotatably mounted on the shaft 59 and operably connected to the accelerator 63 of the car by a link 63', is provided with a laterally extending flange 66 within which is adjustably mounted a stop member 68. This stop member is biased, by the operation of an accelerator return spring 69, into engagement with a flange member 72 extending laterally from a U-shaped fitting 73 fixedly secured to the shaft 59. From the fitting 73 there extends a flange 74 which is provided at its end with a roller member 75. This roller member is contacted by a cam 77 which is fixedly mounted on the shaft 57; and mounted alongside the cam 77 there is provided a support 78 which is also fixedly mounted on the shaft 57. There is adjustably mounted in the support 78 a set screw 79 adapted at its inner end to contact a U-shaped member 84 which is rotatably mounted on the shaft 57 and which is biased clockwise into engagement with the set screw 79 by a spring 85. A cam 86, secured to the member 84, contacts a pin 87 extending from the movable contact, not shown, of a breaker switch 88; and this contact is biased, by a spring, not shown, to its switch open position and is moved to its switch closed position by the spring operated cam 86 which is shaped to effect a closing of the switch during a part of the clutch engaging movement of the motor piston 34.

There is provided, by the switch 88 and the cam means for operating the same, means for controlling the operation of a choke valve operating solenoid 135, Figure 7, to effect a controlled clutch engaging operation of the motor 32. The parts, including the contour of the face of the cam 86, are preferably so constructed and arranged and so operative that the solenoid 135 is energized, to move a choke valve 131 away from a seat 137, during the clutch engaging movement of the piston 34 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off a seat 139, Figure 7, air rushes into the motor 32, via an opening 105, at a relatively high rate to thereby effect a relatively rapid clutch engaging movement of the clutch driven plate; and when the valve 131 is seated, as is disclosed in Figure 7, air flows into the motor 32 via a relatively small opening 10'. The solenoid 135 and valve means for controlling the operation of the motor 32, are described in greater detail hereinafter.

Continuing the description of the mechanism disclosed in Figure 3 a coil spring 89, sleeved over the hub of the crank 60, is connected at one of its ends 90 to the member 73 and the other end of said spring abuts the outer face of the flange 66 on said crank. There is thus provided by the spring 89 and cooperating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 34, the cam 77 is rotated counterclockwise, Figure 4, thereby providing, by its end portion A, B a stop to prevent a clockwise rotation, that is, throttle opening movement, of the accelerator operated flange 74. It is to be noted at this juncture that when the accelerator is depressed to cock the spring 89 and the motor 32 is de-energized to effect a re-engagement of the clutch, the cam 77 is rotated clockwise, Figure 4, to effect controlled opening of the throttle as the clutch plates move into contact with each other, a segment B, C of said cam being shaped to effect this operation. Preferably all points along the segment A, B of the cam 77 are equally distant from the center of rotation of said cam; and the radius of the cam from the point B to the point C progressively decreases. There is thus provided, by the operation of the sector A, B of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B, C of said cam serves to make possible a progressively increased opening of the throttle, by the operation of the accelerator loaded spring 89, as the clutch plates move into driving engagement with each other.

Completing the description of the mechanism of Figure 3 a switch operating member 91, rotatably mounted on the shaft 57, is biased, by a coil spring 92, to rotate in a counterclockwise direction, Figure 4; and the lower end of the member 91 is adjustably connected to the upper arm of the two-armed crank 60 by means of a set screw 97 which is adjustably mounted on the member 91. The upper end of the switch operating member 91 abuts the lower end of a pin 94 which is connected to the movable contact of a breaker switch 95. The breaker switches 88 and 95 are of standard construction; accordingly the same are not disclosed in detail. Both of these switches preferably include a movable contact and a fixed contact, the movable contact being biased to its switch open position by a spring within the switch; and in the case of the accelerator operated switch 95 this spring is overcome, to close said switch, by the operation of the accelerator return spring 69. In other words the switch 95 is closed when the driver removes his foot from the accelerator to close the throttle.

The valve means for controlling the operation of the motor 32 is disclosed in detail in Figure 7 and includes a three way valve unit 99 and the aforementioned choke valve indicated as a whole by the reference numeral 101. Both units are housed within a casing 103 preferably mounted on the casing of the motor 32. The casing 103 is provided with the aforementioned port 105 to provide a vent to the atmosphere, at 106 to receive a duct 109 leading to the intake manifold of the internal combustion engine of the vehicle, and at 113 to receive a conduit 115 leading to a control compartment 111 of the motor. The three way valve unit 99 includes a valve member 117 operably connected to the armature 119 of a grounded solenoid 121 which is secured to the casing 103. When the solenoid 121 is energized the valve member 117 is moved downwardly, Figure 7, to leave a seat 123 and abut a seat 125; and when said solenoid is de-energized a spring 127 serves to return the valve member to its seat 123. The choke valve unit 101 includes the aforementioned valve member 131 which is operably connected to the armature 133 of a solenoid 135 secured to the valve casing 103. As previously briefly described, when the solenoid 135 is energized the valve member 131 is moved off a seat 137 onto a seat 139; and when the solenoid 135 is de-energized a spring 141 serves to return the valve member 131 to its seat 137.

Figure 2:
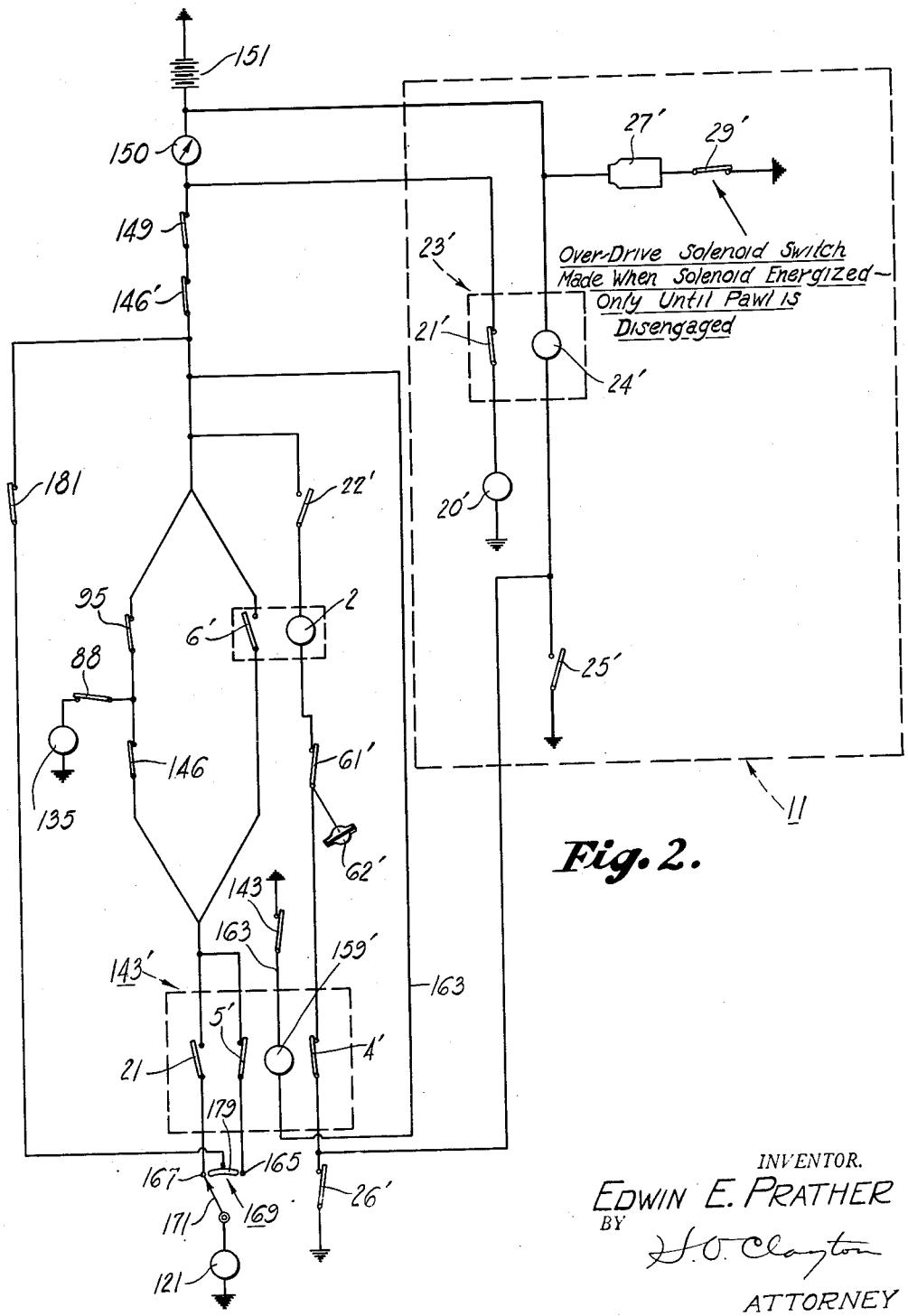
Figure 2 is a wiring diagram of the electrical mechanism disclosed in Figure 1.
Figure 12:
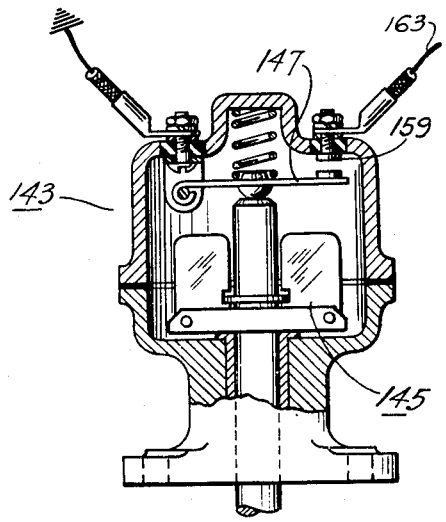
Figure 12 is a sectional view disclosing details of the governor operated switch mechanism of my invention.

The electrical means for controlling the operation of the solenoids 121 and 135 constitutes the most important feature of my invention, said electrical means being disclosed in Figure 2. Describing this control means the grounded movable contact 147 of a breaker switch 143, Figure 12, operated by a vehicle speed responsive centrifugally operated governor 145, is, with an upshift operation of the governor, movable into contact with the fixed contact 159 of the switch; and this operation, that is, the closing of the breaker switch, serves to energize the coil 159' of a relay switch 143'. This coil is electrically connected, by electrical means including a wire 163, with a clutch operated breaker switch 146' which is in turn, as disclosed in Figure 2, connected in series with a manually operated dash mounted lockout switch 149, the ignition switch 150 of the car and the grounded battery 151. The relay switch mechanism 143' includes, in addition to the coil 159, normally open switches 2' and 4' and a normally closed switch 5'. The switch 2' is electrically connected in series with a breaker switch 146 actuated by the input lever 54 of the alternator 64, the aforementioned accelerator operated switch 95, the clutch pedal operated breaker switch 146' which is a duplicate of the switch 146, the cutout switch 149, the ignition switch 150, and the battery 151. The switch 5' of the relay 143' is closed, to effect a low gear operation of the transmission, when the vehicle is at a standstill or is traveling below a certain speed; and the switch 2' is closed, to effect a high gear setting of the transmission, when the vehicle is traveling at or above the aforementioned speed, that is, above governor speed. It is also to be noted that the Keller-pawl overdrive unit 11 is automatically operated, to effect its overdrive setting, immediately after the three speeds forward and reverse transmission unit 10 is established in its high gear setting.

Referring to Figure 1, the wiring interconnecting the aforementioned switches and battery preferably includes a conductor 151' interconnecting the battery 151 with the ignition switch 150, a conductor 153 interconnecting the cutout switch 149 with the switch 146', a conductor 154 interconnecting the latter switch with the accelerator operated switch 95, a conductor 155 interconnecting the latter switch with the switch 146, and a conductor 157 interconnecting the latter switch with the switch 2'. The switches 5' and 2' are electrically connected respectively to fixed contacts 165 and 167 of a selector switch mechanism 169 operated by the motor 32. To one end of the movable contact 171 of the switch mechanism 169 there is pivotally connected a link 173 which is pivotally connected to the motor operated transmission operating crank 14, Figure 1. The movable contact 171 is electrically connected to the grounded solenoid 121 by a contact 175 and a conductor 177, Figure 1. A fixed contact 179 of the switch mechanism 169 is electrically connected to a motor operated breaker switch 181 by a conductor 182; and the latter switch is electrically connected to the clutch pedal operator switch 146' by a conductor 183 and a part of the conductor 154.

Contacts 165 and 171, contacts 171 and 179 and contacts 167 and 171 of the selector switch mechanism 169, providing three separate switches two of which are in series of the governor operated switch 143 and the third, that is, the switch 171, 179, being in series with the switch 181; and the movable contact 171 is so connected with the transmission operating crank 14, and said switch mechanism is so constructed, that the switch 167, 171 is closed when the transmission is established in its second gear setting, the switch 165, 171 is closed when the transmission is established in its high gear setting, and the switch 171, 179 is at all times closed except when the transmission is completely or substantially completely established in either its second gear setting or its high gear setting. The breaker switch 181 is actuated by the piston 34 of the motor 32 and is made at all times except when said piston is in its released that is clutch engaged position; the switch 146 is made when the alternator 64 is in its released, that is, pre-selecting position; and the clutch operated switch 146' is broken when the clutch pedal is completely or substantially completely depressed to disengage the clutch.

Referring to Figures 1 and 2 the grounded choke valve controlling solenoid 135 is wired to the motor operated clutch control switch 88 by a conductor 185 and said switch is electrically connected, by a conductor 186, to the conductor 155 that is to a point in the electrical circuit lying between the accelerator switch 95 and the alternator operated switch 146; and with such a construction the clutch engaging control operation of the motor 32 is disabled when the accelerator is depressed to open the switch 95.

Figure 10:
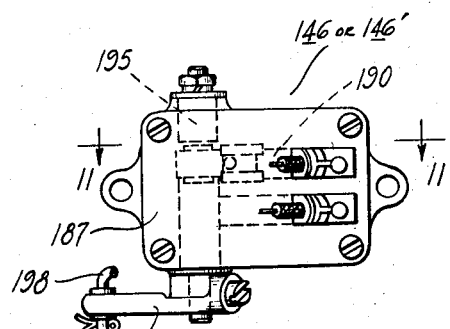
Figure 10 is a plan view of the alternator and clutch pedal operated breaker switch of my invention.
Figure 11:
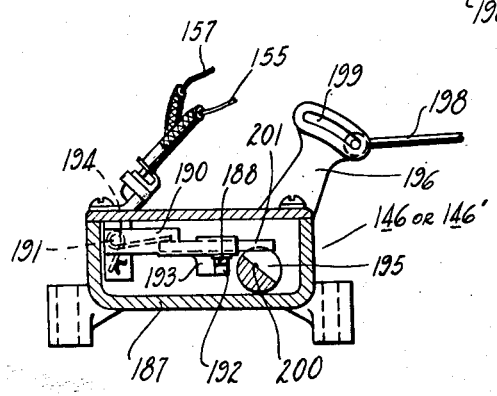
Figure 11 is a sectional view, taken on the line 11—11 of Figure 10 disclosing details of the breaker switch of said figure.

Continuing the description of the electrical control means of my invention there are disclosed, in Figures 10 and 11, details of the alternator operated switch 146 and the clutch pedal operated switch 146' the two switches and the force transmitting linkage for operating said switches being identical in construction and operation. The description given below will refer to the switch 146. The latter switch mechanism includes a two part casing 187 which houses a movable contact member 188 mounted upon a support member 190 of electrically conductive material said support being pivotally mounted at 191 upon said casing. The casing 187 also houses a fixed contact 192 mounted upon a support 193 of electrically conductive material said support also being secured to said casing. The support 193 is connected, by the electrical conductor 155, to the solenoid 95; and the support 190 is connected, by the conductor 157, to the switch 143. The movable contact 188 is biased into abutment with the fixed contact 192 by a spring 194 acting upon the support 190; and to separate said contacts, that is, open the switch mechanism 146, there is provided a cam shaft 195 journalled in the casing 187 and rotated by a crank 196 secured to one end of said shaft.

Describing the operation of the switch 146 when the alternator input lever 54 is in its released position, that is, the position disclosed in full lines in Figure 11, a link 198, secured to the lever 54 rests within the lower end of a slot 199 in the crank 196; all as is disclosed in Figure 11. At this time the switch contacts 188 and 192 are in abutment that is the switch 146 is closed. When the motor 32 is vacuum energized the piston 34 rotates the lever 54 clockwise, Figure 8, counterclockwise, Figure 1, and during the first increment of this clutch disengaging movement of the piston the end of the link 198 is moved to the left, Figure 11, to take up the lost motion provided by the slot 199; and it is to be noted that the switch 146 remains closed during this movement. Continued clutch disengaging movement of the piston 34 then results in a counterclockwise rotation of the crank 196, Figure 11, and cam shaft 195 connected thereto; and this operation serves to take up the lost motion between the right end of a flat 200 on said shaft and the bottom of a member 201 of insulating material secured to the movable support member 190. Continued clutch disengaging and transmission operating movement of the piston 34 then serves to continue the counterclockwise rotation of the cam shaft 195 to open the switch 146 this operation being effected just as the transmission is being established in gear.

Describing the reverse operation of the switch 146, that is, the operation when the spring 59 of the motor 32 moves the piston to the right, Figure 1, to engage the clutch and operate the alternator 64, the first increment of movement of said piston serves to move the link 198 to the right, Figure 11, to take up the lost motion provided by the slot 199; and the switch 146 of course remains open during this operation. Continued clutch engaging movement of the piston 34 serves to rotate the crank 196 clockwise, Figure 11, the switch 146 remaining open during this operation; and continued clockwise rotation of said crank, by the clutch engagement movement of said piston, serves to return the parts of the switch mechanism to the switch closed position that is to the relative positions disclosed in Figure 11.

Completing the description of the electrical control means of my invention and incidentally describing the most important feature of my invention, there is included, in the mechanism for operating the transmission units 10 and 11, an intake manifold vacuum or what may be termed torque responsive means operable to effect an upshift operation of the transmission 10 from its second gear setting to its high gear setting. This control mechanism includes the aforementioned solenoid operated switch 6' which is disclosed in Figure 2, is electrically connected in parallel with the accelerator operated switch 95 in the electrical circuit interconnecting the clutch operated switch 146' and switches 2' and 5' of the relay 143'. There is thus provided, by the switch 6', a means for controlling the relay switches 2' and 5' said means supplementing the accelerator operated switch 95 in the control of the transmission 10; for when the switch 6' is closed and the relay coil 159' is energized there results an operation of the motor 32 to establish the transmission 10 in its high gear setting.

As disclosed in Figure 2 the solenoid 2 is electrically connected in series with the grounded battery 151, the switches 150, 149, and 146', a dash mounted cutout switch 22', a breaker switch 61', operated by an intake manifold vacuum operated motor 62', the switch 4' of the relay 143', and the grounded shift rail breaker operated switch 26' which is normally closed but which is open by the high gear shift rail just as the operation of establishing it in its high gear setting is completed. The parts of the switch operating vacuum motor 62' and switch 61' are so constructed and arranged and so operative that the switch is closed when the intake manifold vacuum of the internal combustion engine of the vehicle reaches a certain factor; and this vacuum factor, as is well known to those skilled in the art, is a function of the speed of the engine and position of the throttle valve 16 of the carburetor of the engine.

Briefly describing the operation of the torque responsive mechanism for effecting the upshift operation of the motor 32, when the speed of the vehicle is increased sufficiently to close the governor operated switch 147, 159 and the intake manifold vacuum reaches the aforementioned controlling factor then the switches 4' and 2' are closed; and this operation, assuming the switches 26', 22', 146', 149, and 150 to be closed, results in an energization of the solenoid 2 to effect a closing of the switch 6'; and the latter operation, as previously described, results in a high gear setting of the transmission 10. Now it is to be particularly noted that this high gear operation of the motor 32 is effected despite the then existing depression of the accelerator of the car to maintain the speed of the vehicle; for the closure of the switch 61' is effected as a function of the degree of intake manifold vacuum and this vacuum may be increased by increasing the intake manifold vacuum creating pumping operation of the pistons of the engine; for the greater the speed of the engine the greater the pumping operation resulting in an evacuation of the intake manifold; accordingly, with the mechanism of my invention the transmission 10 is automatically established in its high gear setting when the engine speed is relatively high it being assumed that the throttle 16 at the time sufficiently closed to effect the intake manifold vacuum necessary to effect this operation of the transmission. It may be said therefore that the mechanism of my invention provides a torque responsive upshift operation of the transmission 10; for the torque of the engine closely parallels the speed of the engine.

Completing the brief description of the operation of the torque responsive means of my invention it is to be noted that when the solenoid 2 is energized to effect the high gear operation of the motor 32 the throttle 16 is at the same time closed this operation being described above in describing the operation of the lost motion connection 1; and this closing of the throttle prevents a racing of the engine inasmuch as the accelerator at the time is depressed.

Describing now the complete operation of the mechanism of my invention and incidentally completing the description of the parts of said mechanism not heretofore described, it will be assumed that the vehicle is at a standstill and that the engine is idling; and under these conditions the transmission will be established in its second gear setting. Explaining the operation of the mechanism to effect this setting, it will be assumed that the switches 5', 149, 150, 146, 95, 146', and 165, 171 are closed and the switch 6' is open as the vehicle is being decelerated to a stop, accordingly the solenoid 121 is energized to open the valve 117; and this results in an energization of the motor 32 to effect the second gear setting of the transmission, the electrical circuit including said switches being automatically opened, by the opening of the switches 171, 179, and 146, at the time the setting of the transmission is effected.

Explaining this operation in greater detail it is to be remembered that the selector switch 165, 171 is closed when the transmission is established in its high gear setting this operation being effected to prepare the mechanism for the low gear setting of the mechanism; and it is also to be remembered that the alternator operated switch 146 is closed prior to an operation of the motor 32, and that the relay switch 5' is automatically closed, to initiate the second gear operation of the mechanism, when the speed of the vehicle is brought down to a certain factor.

With the second gear operation of the motor 32 the piston 34 returns to its clutch engaged, that is, released position; and with this operation the switch 181 is opened, the switches 146 and 167, 171 are closed, and the crank 71 of the alternator is returned to its preselecting position disclosed in full lines in Figure 8. The mechanism is then prepared for a subsequent power operated high gear operation of the transmission. As to above described second gear operation of the mechanism, it is to be remembered that the clutch is operated to facilitate the operation of the transmission; and the throttle is held closed during said operation.

The transmission being established in its second gear setting, the driver, to get the vehicle under way, will then depress the accelerator; and this operation in getting the vehicle under way in second gear is facilitated by the operation of the fluid coupling of the power plant. When the speed of the vehicle exceeds governor speed the switch 147, 159 will be automatically closed and then when the accelerator is released to close the switch 95 there will be effected another energization of the motor 32 to successively effect a disengagement of the clutch and a high gear setting of the transmission. In this operation the throttle is again held closed by the cam 77 to facilitate the operation of the mechanism.

As the high gear setting of the transmission is being completed the switches 146 and 171, 179 are opened thereby again initiating the return of the piston 34 to its released position; and it is to be remembered that during the high gear operation of the mechanism should the driver suddenly decelerate the car sufficiently to close the switch 147, 157 then after the high gear operation of the transmission is completed, and assuming the accelerator operated switch 95 to remain closed, the mechanism will be automatically operated to establish the transmission in its second gear setting. This operation is made possible by the operation of the switch 146.

Assuming that the clutch pedal is not depressed to open the switch 146', the transmission will then be shuttled back and forth between its second and high gear settings depending upon the speed of the vehicle, the throttle and clutch being operated to facilitate these power operations of the mechanism.

In this shuttling operation one or the other of the motor operated selector switches 167, 171 and 165, 171 is made just as the transmission is being established in gear thereby preparing the mechanism for a subsequent operation of the transmission; and said operation is then initiated by the operation of the governor switch 143.

Should the driver at any time desire to overrule the automatic power operation of the mechanism he need but press the clutch pedal sufficiently to open the switch 146' thereby disabling the power means. Duplicating the operation of the alternator operation switch 146, the switch 146' is closed by the depression of the clutch pedal only during the last increment of the depressing operation. A manual operation of the shift lever 114 then serves to establish the transmission in the desired setting, first one and then the other of the alternator legs 100 and 98 being moved to successively establish the transmission in its second and high gear settings or in its second and low gear settings. The transmission may also be successively manually operated between its reverse gear setting and one or the other of the low and high gear settings.

Speaking of the overrule control means of my invention the operation of the switch 6' constitutes what may be said to be an overrule operation inasmuch as the operation of this switch, as a result of the increase in the intake manifold vacuum, overrules the operation of the accelerator in its upshift operation of the switch 5; for when the intake manifold vacuum is sufficiently high and the vehicle is traveling above governor speed the motor 32 is operative to establish the transmission in high gear this operation being effected despite the then existing depression of the accelerator.

Reviewing other features of my invention the operation of the switch 171, 179 serves to insure the clutch disengaging and transmission operating operation of the motor 32 once initiated and despite an opening of the accelerator operated switch 95 during said operation; the motor operated switch 181 serves to open the electrical circuit including the switch 171, 179 when the operation of the transmission is completed thereby preventing an undesired power operation of the transmission should the same slip out of gear and close the latter switch; the dash mounted cutout switch 149 may be opened at will thereby disabling the power means of the invention; the alternator operated switch 146 serves to insure a recycle second gear operation of the transmission if this operation is called for by the governor operated switch 143; and the construction and operation of the clutch operated switch 146', including a lost motion connection 199' duplicating the connection 198, 199 is such that the operation of the motor 32, to effect the operation of the transmission and clutch, is completed prior to the opening of said switch.

There is thus provided a simple, compact and easily serviced combined manually and power operated mechanism for operating a change speed transmission mechanism of an automotive vehicle said mechanism including a three speeds forward and reverse transmission combined with a Keller-pawl type of overdrive unit. The selector switch mechanism 169, including the selector switches 167, 171, and 165, 171 and the switches 2' and 5' of the series connected governor operated relay switch 143', cooperate to effect a control of the vacuum motor 32 to shuttle the transmission back and forth between its second and high gear settings the clutch being operated to facilitate this operation of the transmission. If the driver desires an engine torque responsive upshift operation of the transmission 10 rather than an upshift operation controlled by the position of the accelerator, he need but close the switch 22' whereupon the torque responsive switch 6' takes over the control of the motor 32. With either the control by the accelerator operated switch 95 or the switch 6' the transmission mechanism, in its upshift operations, is successively shifted from its third gear direct setting to its third gear overdrive setting; and with the downshift operation of the transmission mechanism of my invention the shift is from third gear overdrive setting directly to the second gear direct setting. However, a third gear overdrive setting to third gear direct setting may be effected by a kickdown operation of the overdrive unit whereupon the third gear direct to second direct shift will then be effected by an operation of the governor 143.

Although only one embodiment of the invention has been illustrated and described, various changes in the form and relative arrangements of the parts may be made to suit requirements.

I claim:

1. In an automotive vehicle provided with an accelerator, a clutch, a three speeds forward and reverse transmission, an electrically controlled centrifugal pawl type of overdrive, and means interconnecting the clutch, transmission and overdrive; means for operating the transmission and clutch and controlling the operation of the overdrive including a single acting pressure differential operating motor said means including an alternator connecting the motor with the clutch and transmission, valve means for controlling the operation of the motor, a solenoid for operating the valve means, electrical means for controlling the operation of the solenoid including, in a series parallel relationship, a motor operated selector switch mechanism including a plurality of switches, a governor operated relay including a normally open switch connected to one of the switches of the selector switch mechanism, and a normally closed switch connected to another of the switches of the selector switch mechanism, an accelerator operated switch connected to both of the aforementioned switches of the relay, a solenoid operated switch connected to both of the aforementioned switches of the relay and electrically connected in parallel with the accelerator operated switch, and a grounded battery connected to both the accelerator operated switch and the solenoid operated switch; electrical means for controlling the solenoid operated switch including, in series, a grounded switch operated by the transmission, a normally open switch of the relay, a manifold vacuum operated switch and a solenoid; and electrical means interconnecting the electrical means of the centrifugal pawl overdrive with the aforementioned transmission operated switch and battery.

2. In an automotive vehicle the combination with an accelerator, a friction clutch, and a change speed transmission mechanism including a centrifugal pawl type of overdrive and a three speeds forward and reverse transmission; of power and manually operated means for operating said clutch, mechanism comprising manually operated means for establishing the three speeds forward and reverse transmission in any one of its settings, and power means, including a transmission operating single acting pressure differential operated motor controlled in part by an accelerator operated control means and vehicle speed responsive control means, for successively effecting a shift of the change speed transmission mechanism from its second gear direct setting to its third gear direct setting followed by an operation of the overdrive to establish the transmission mechanism in a third gear overdrive setting, the clutch being operated by the motor to facilitate the operation of the three speeds forward and reverse transmission, said power means also being operative to effect either a kickdown shift of the transmission mechanism from third gear overdrive to third gear direct followed by a shift to second gear direct, or an automatic shift of the transmission mechanism from its third gear overdrive setting to its second gear direct setting.

3. A change speed transmission mechanism adapted for use in an automatic vehicle said mechanism including a three speeds forward and reverse transmission unit and a centrifugal pawl type of overdrive unit, together with means for operating the transmission unit and for controlling the operation of the overdrive unit including a single acting motor, means, including a direction changing mechanism, interconnecting the motor and transmission unit and adapted, when operated, to alternately effect first one and then the other of two settings of the transmission unit, means including a solenoid, for controlling the operation of the motor, electrical means, including, in series, a switch adapted to be actuated by an accelerator and a relay switch mechanism, together with a pressure differential motor operated switch, electrically connected in parallel with the accelerator operated switch, for controlling the latter means, together with means for controlling the operation of the electrical means including a switch mechanism operated by the three speeds forward and reverse transmission unit.

4. A change speed transmission and clutch mechanism adapted for use in a vehicle said mechanism including a clutch, a three speeds forward and reverse transmission unit, and a centrifugal pawl type of overdrive unit; together with means for operating the clutch and the transmission unit and for controlling the operation of the overdrive unit including a single acting pressure differential and spring operated motor, means, including a direction changing mechanism, connecting the motor with the clutch and transmission and adapted, when operated, to alternately effect first one and then the other of two settings of the transmission unit and to operate the clutch to facilitate the operation of the transmission unit, means, including a solenoid, for controlling the operation of the motor, means, including, in series, a switch adapted to be actuated by the accelerator of the vehicle and a relay switch mechanism, together with a pressure differential motor operated switch electrically connected in parallel with the accelerator operated switch, for controlling the latter means, together with means for controlling the operation of the electrical means including a switch mechanism operated by the three speeds forward and reverse transmission unit.

5. Control means adapted to control the operation of a change speed transmission, a centrifugal pawl overdrive unit, the friction clutch and the throttle of the power plant of an automotive vehicle which is provided with an accelerator and a clutch pedal; said means comprising a single acting pressure differential operated motor operatively connected to the transmission, clutch and throttle, valve means for controlling the operation of said motor, and electrical means for controlling the operation of the valve means to successively effect an energization and a de-energization of the motor including, in series, a grounded source of electrical energy, an accelerator operated switch, a grounded valve operating solenoid, a motor operated selector switch mechanism, a governor controlled relay switch mechanism, and a clutch pedal operated switch which is opened only when the clutch pedal is depressed a predetermined amount, together with means for controlling the operation of the overdrive unit including a switch which is normally closed but which is open to effect an operation of the overdrive unit when the transmission is effected in its high gear setting.

6. Control means adapted to control the operation of a three speeds forward and reverse transmission, a centrifugal pawl overdrive connected with the transmission, the friction clutch connected with the transmission and the throttle of the power plant of an automotive vehicle said vehicle being provided with an accelerator and a clutch pedal, said means comprising a single acting pressure differential operated motor operably connected to the transmission, clutch and throttle, valve means for controlling the operation of said motor, and electrical means for controlling the operation of the valve means to successively effect an energization and a de-energization of the motor including, in series, a source of electrical energy, an accelerator operated switch, a valve operating solenoid, a motor operated selector switch mechanism including three switches one of which is electrically connected to the source of electrical energy by electrical means which is shunted around the accelerator switch, a portion of the switch mechanism of a governor controlled relay, and a clutch pedal operated switch which is opened only when the clutch pedal is depressed a predetermined amount, together with means for controlling the operation of the overdrive unit including a switch which is normally closed but which is opened to effect an operation of the overdrive unit when the change speed transmission is established in its high gear setting.

7. The combination with an accelerator, a three speeds forward and reverse transmission, and a centrifugal pawl type of overdrive of an automotive vehicle, the transmission and overdrive together combining to provide a change speed transmission mechanism, of means for operating the transmission and for controlling the operation of the overdrive to effect, successively, a shift from the second gear direct setting of the transmission to a third gear direct setting thereof immediately followed by an overdrive operation of the overdrive mechanism to establish the entire transmission mechanism in its third gear overdrive setting, said operating and control means including a single acting pressure differential operated motor, means, including an alternator mechanism, interconnecting the three speeds forward and reverse transmission with the motor, valve means for controlling the operation of the motor, and electrical means for controlling the operation of the overdrive and the valve means including, in series, a grounded battery, an accelerator operated switch, switch mechanism of a relay, a motor operated selector switch mechanism, and a grounded valve operating solenoid, said electrical means further including a solenoid operated switch electrically connected in series with the battery, the aforementioned relay switch mechanism, and the motor operated selector switch mechanism and in parallel with the accelerator operated switch, together with means for controlling the operation of the overdrive including a grounded switch mechanism actuated by the three speeds forward and reverse transmission.

8. The combination with an accelerator, a three speeds forward and reverse transmission and a centrifugal pawl type of overdrive in an automotive vehicle, the transmission and overdrive together combining to provide a change speed transmission mechanism, of means for operating the transmission and for controlling the operation of the overdrive to successively effect a shift from the second gear direct setting of the transmission to a third gear direct setting thereof, immediately followed by an overdrive operation of the overdrive mechanism to establish the entire transmission in its third gear overdrive setting, said operating and control means including a single acting pressure differential operated motor, means, including an alternator mechanism, interconnecting the three speeds forward and reverse transmission with the motor, valve means for controlling the operation of the motor, and electrical means for controlling the operation of the overdrive and the valve means including, in series, a battery, an accelerator operated switch, switch mechanism, including a normally closed switch and a normally open switch, of a governor operated relay, a motor operated selector switch mechanism, and a grounded valve operating solenoid, said electrical means further including a relay switch electrically connected in series with the battery and motor operated selector switch mechanism and in parallel with the accelerator operated switch, a relay coil for operating the relay switch, torque responsive means for controlling the relay coil including a pressure differential motor operated switch and a switch constituting a part of the aforementioned governor operated relay, together with means for controlling the operation of the overdrive including a grounded switch mechanism actuated by the three speeds forward and reverse transmission.

EDWIN E. PRATHER.

REFERENCES CITED

The following references are of record in the file of this patent:

UNITED STATES PATENTS

| Number    | Name         | Date          |
|-----------|--------------|---------------|
| 2,225,493 | Barnes       | Dec. 17, 1940 |
| 2,231,876 | Beltz        | Feb. 18, 1941 |
| 2,241,632 | Claytor      | May 13, 1941  |
| 2,254,334 | Vincent      | Sept. 2, 1941 |
| 2,281,916 | Claytor      | May 5, 1942   |
| 2,319,515 | Priebe       | May 18, 1943  |
| 2,342,960 | Neracher et al. | Feb. 29, 1944 |
| 2,487,482 | Schotz       | Nov. 8, 1949  |
| 2,514,002 | Long         | July 4, 1950  |
| 2,528,772 | Neracher     | Nov. 7, 1950  |